INVENTOR
ROBERT W. ALLINGTON

BY ATTORNEYS

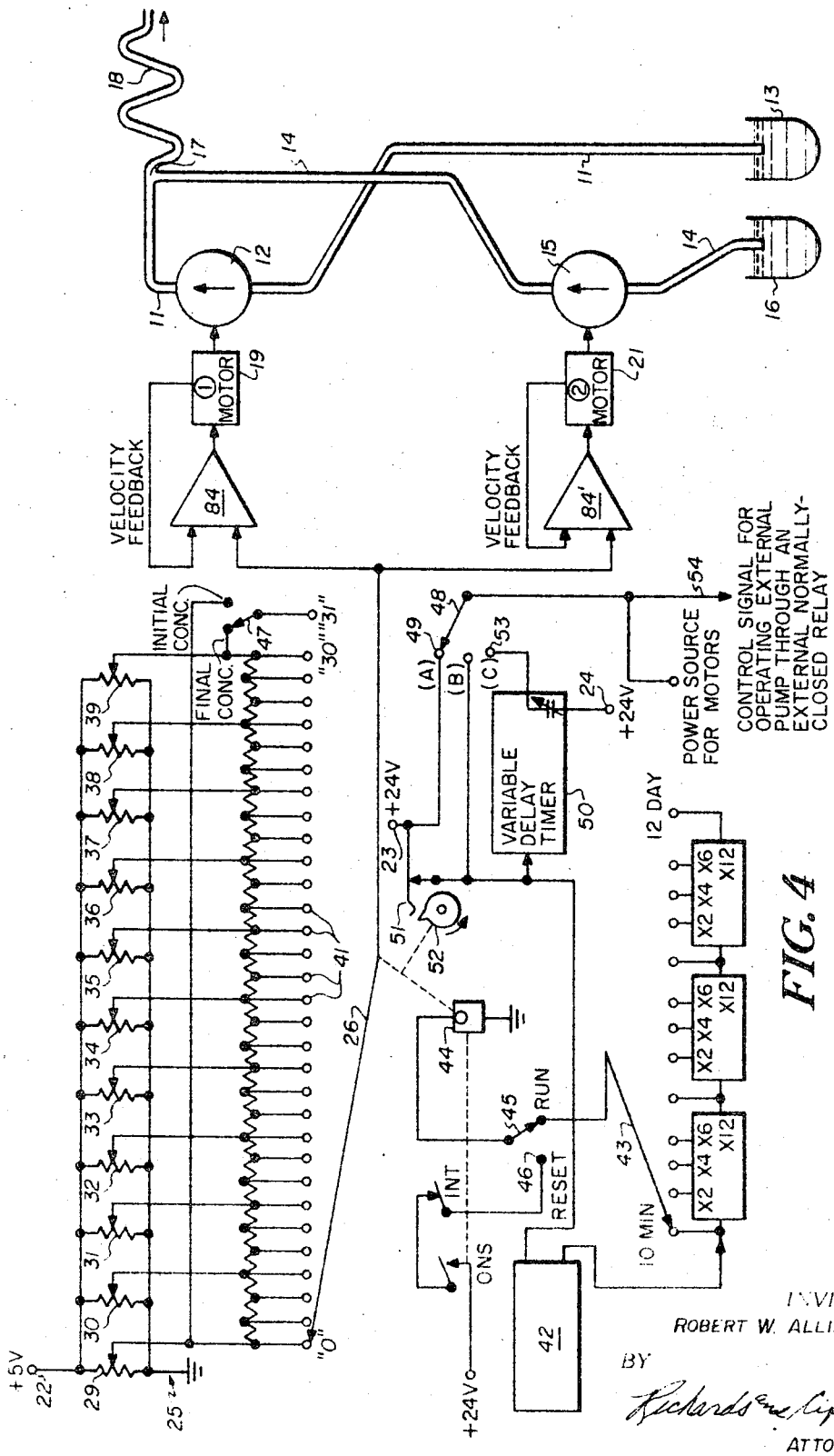

United States Patent Office 3,398,689
Patented Aug. 27, 1968

3,398,689
APPARATUS PROVIDING A CONSTANT-RATE TWO-COMPONENT FLOW STREAM
Robert W. Allington, Lincoln, Nebr., assignor to Instrumentation Specialties Company, Lincoln, Nebr., a corporation of Nebraska
Filed Jan. 5, 1966, Ser. No. 518,891
7 Claims. (Cl. 103—11)

ABSTRACT OF THE DISCLOSURE

Apparatus is described for providing a constant-rate flow stream made up of two components, for use in metering liquid flow streams into columns for liquid chromatography or for preparing density-gradients for density gradient centrifugation, among other purposes, which includes two positive displacement pumps, each operated by a separate electric motor, each motor in turn operated by control means sensitive to a control signal. The control means for one pump and motor for pumping the first component being operated at maximum speed when the control signal reaches a maximum value, at zero speed when the control signal is at a zero value; and at intermediate speeds at intermediate values of the control signal in a substantially linear relationship. The other control means, drive motor and pump, conversely, being operable to produce a zero flow rate at a maximum level of the control signal, and at a maximum rate, equal to that of the first pump, when the control signal is at a zero value. The control signal is derived by means of a programming mechanism consisting of a plurality of potentiometers operated by a stepping switch and a variable rate pulse generator.

---

This invention relates to apparatus for providing a constant-rate flow stream made up of two components. It is intended that the pumps producing this constant-rate flow stream will produce a programmed variation in the ratio concentration of the two components of the flow stream. The method of such programming lends itself to easy operation of the apparatus and the apparatus lends itself equally well to short duration programs and long duration programs with either large or small rates of flow.

An example of prior art in this field is a set of series-connected liquid-filled chambers, where the outlet chamber of the series is connected to a constant-displacement pump. Each chamber may be filled with a certain initial concentration of a two component solution. If the chamber connected to the pump is filled with an almost pure solution of a first component, succeeding chambers are filled with progressively lower concentrations of the first component and higher concentrations for the second component, and the last chamber in the series is filled with a substantially pure solution of the second component, such apparatus will produce a constant-rate flow stream whose concentration varies in some predetermined manner, from a solution of predominately a first component to a solution of predominately a second component. This type of apparatus is undesirable because it is very difficult to calculate the initial concentrations of the liquids in the series-connected chambers, in order to produce a specified variation of relative concentration with respect to the amount of liquid pumped.

Another approach which has been taken is to provide two pumps which respectively pump solutions from reservoirs of first and second solutions. The outputs of the two pumps are mixed and the composition of the resulting flow stream is analyzed by some method such as photometry, electrical conductivity, or pH. The signal from the analysis unit is compared to a signal derived by a programming apparatus. The difference between the programmed signal and the relative concentration signal is used to vary the difference in the speeds of the two pumps. The sum speed of the two pumps is held constant by other means. Such apparatus is complicated and the only materials which can be pumped are those for which there exists a convenient, usually electrical, procedure for measuring concentration.

The subject invention combines the features of relative simplicity of construction and considerable ease in operation by the user of the apparatus. It is contemplated that potential uses of this apparatus are for metering liquid flow streams into columns for liquid chromatography and for the purpose of preparing density-gradients for density-gradient centrifugation. For example, the apparatus could be used for column liquid chromatography to provide "gradient elution." Certain column chromatographic procedures, especially ion-exchange chromatography, require that the solvent entering the inlet of the chromatographic column change its composition as time progresses.

A vertical tube may, for example, be supplied with an ion-exchange resin. The tube has an inlet at the top and an outlet at the bottom. A mixture of chemicals to be separated is deposited on top of the ion-exchange resin column. A solvent is fed into the inlet of the column. The pH, or some other characteristic of the liquid, is such that a chemical equilibrium is established between the material to be separated and the ion-exchange resin such that the material to be separated is ionically bound to the resin. Thus the material to be separated remains stationary in the column.

If the pH, or other pertinent characteristic of the solvent, is suitably changed after a short period of time, the ionic equilibrium conditions will be shifted in such a way that some of the chemicals of the mixture to be separated will no longer be as tightly bound to the stationary resin. The solvent will tend to wash this particular chemical down through the column and out through the outlet of the column to a suitable collecting receptacle.

If the pH of the solvent is again changed, a different species of chemical can be "eluted" from the column as described above. If the pH is continuously changed over a period of time, one chemical after another can be eluted from the column and collected separately at the outlet of the column. If certain of the chemicals in the column tend to be eluted at the same, or nearly the same, pH level, they would tend to come out in one unseparated group if the pH of the solvent going into the column were changed in large steps or if the rate of change of pH were too great. The subject invention has the capability of programming the pH, or other characteristic of the liquid, in such a way that the rate of change of pH with respect to time or delivered volume of liquid can be made very low at such a critical pH level. Gradient elution is used in other types of column liquid chromatography besides ion-exchange chromatography. The physical-chemical mechanism is somewhat different but the overall result is similar.

The technique of density-gradient centrifugation is described in some detail in my Patent No. 3,151,639, dated Oct. 6, 1964, on a density-gradient fractionator. The application of the subject invention to this technique is to preform the gradient in the centrifuge tube before the material to be separated is layered on top of the density-gradient column and the tube put in the ultracentrifuge. This could be accomplished by sticking a delivery tube in through the open top of the centrifuge tube to a point near the bottom of the centrifuge tube.

Pumps of the subject invention could be connected to two miscible solutions, one having a high density and the other having a low density. The programming of the pumps would be set up in such a way as to start with a low density output stream and provide a progressively increasing density. When the apparatus is turned on, first the low density liquid would be metered into the bottom of the centrifuge tube and the progressively heavier liquid metered into the bottom of the centrifuge tube would float the lighter density liquid on up to the top of the centrifuge tube as the tube was filled.

The subject invention makes use of two pumps, the displacement rate of each being proportional to the rate at which they are operated by electric motors or other driving means. Said electric motors are to be operated by control means which are sensitive to the application of a control signal. The control means for the pump and motor for pumping the first component shall operate the pump at maximum speed when the control signal reaches a maximum value and shall operate the pump at zero speed when the control signal is at a zero value. It is contemplated that a substantially linear relationship would hold for intermediate values of the control signal.

The control means for operating the drive motor and pump for pumping the second component would operate the pump for zero flow rate at a maximum level of control signal and would operate the pump at a maximum rate, equal to the maximum rate of the first-component pump, when the control signal is at a zero value. It is contemplated that a substantially linear relationship would hold for intermediate values of the control signal. Under these conditions, regardless of the value of the control signal, the sum of the flows of the two pumps would equal a constant value. A constant flow rate provides constant fluid flow and other dynamic conditions within the chromatographic column, and thus makes the performance of the column more predictable.

The control signal is derived by means of a programming mechanism. Such a programming mechanism could, for an electrical control signal, consist of the output of the center element of a potentiometer which is mechanically operated by a linkage connected to a pre-cut cam. This cam would be cut in a way related to the desired variation of concentration with respect to time. Since the sum of the flow rates of the two pumps is a constant value, such a relationship of concentration to time would be equivalent to a relationship of concentration with respect to the amount of liquid which has been pumped. The duration of the pumping program could be determined by the rate of rotation of the programmed cam.

An object of my invention is to provide apparatus for combining two streams of fluid to produce a single stream having a substantially constant flow.

Another object of my invention is to provide in such apparatus a pair of pumps, the first of which is made to operate faster by control means while the second is made to operate slower, streams from said pumps merging into the stream of constant flow.

A further object of my invention is to provide in such apparatus programming means made up of a group of variable potentiometers and a stepping switch to sequentially select voltages from successive poles.

A still further object is to provide pumps which are suitable for use in such apparatus.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 4 is a wiring diagram of another embodiment of the invention in which servoamplifiers are employed rather than the voltage-controlled pulse oscillators shown in FIGURE 1.

Figure 1:
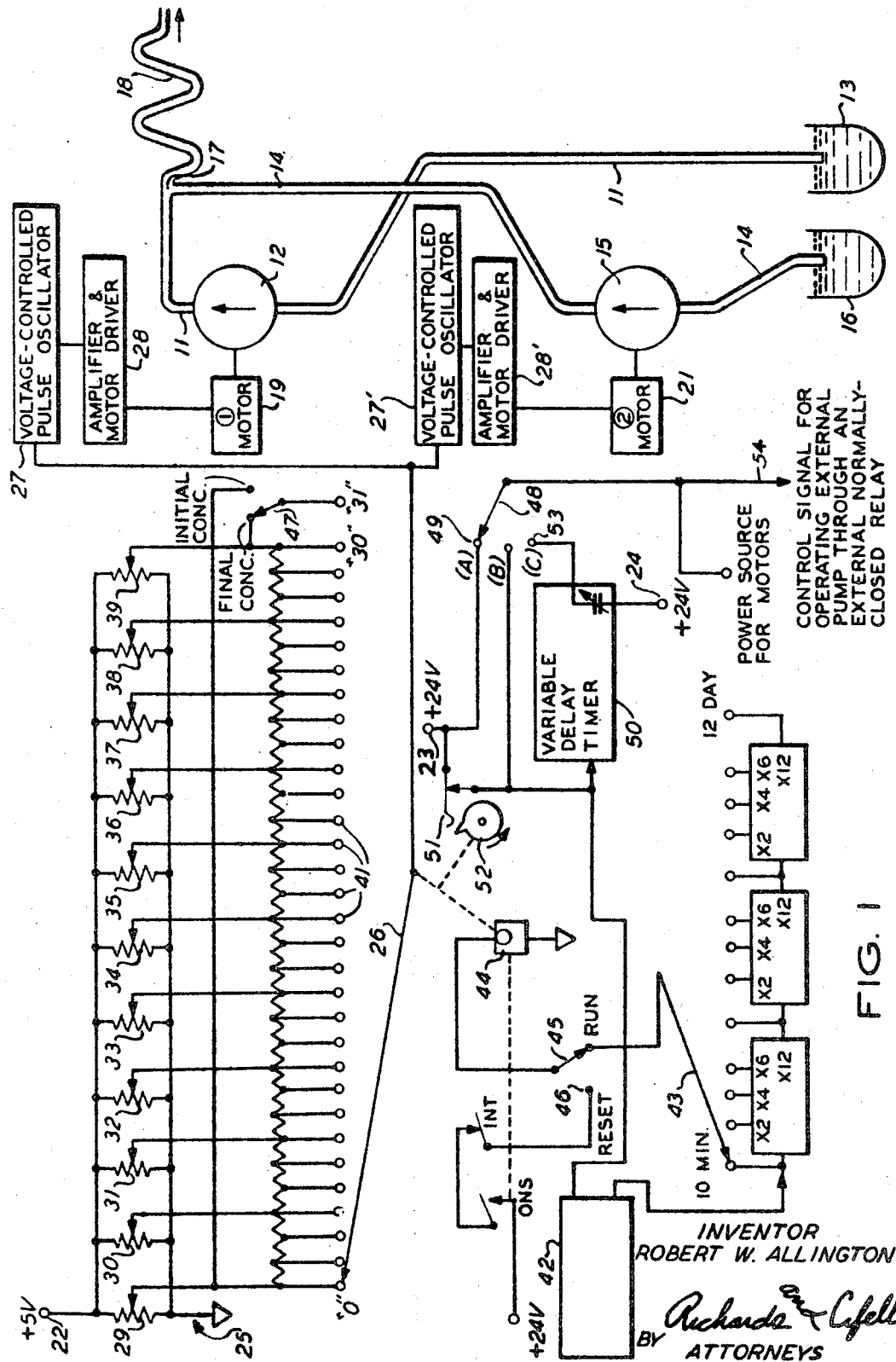
FIGURE 1 is a wiring diagram of one embodiment of my invention.

Referring to the drawings in detail, and first considering the embodiment of my invention represented by the diagram of FIGURE 1, the apparatus of my invention provides for combining the outputs from two constant-displacement pumps to form a stream of fluid, usually liquid, in a single pipe. Fluid, usually liquid, is drawn by a first pump 12 through a pipe 11 from a reservoir 13, and a fluid, usually liquid, is drawn by a second pump 15 through a pipe 14 from a reservoir 16 to combine with fluid in pipe 11 and flow through a pipe 18 to the desired point. The pumps 12 and 15, called, respectively, "first" and "second" pumps, have power means 19 and 21 to drive them, said means, in the present embodiment, being illustrated as electric motors.

Figure 2:
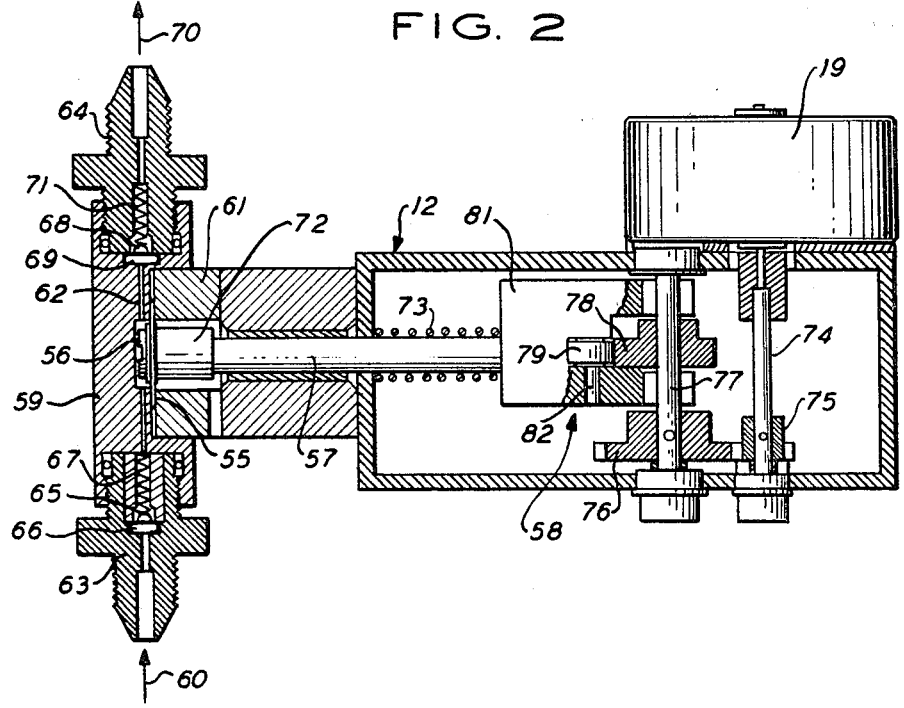
FIGURE 2 is a horizontal sectional view, with parts in plan, of a preferred form of pump involving my invention.
Figure 3:
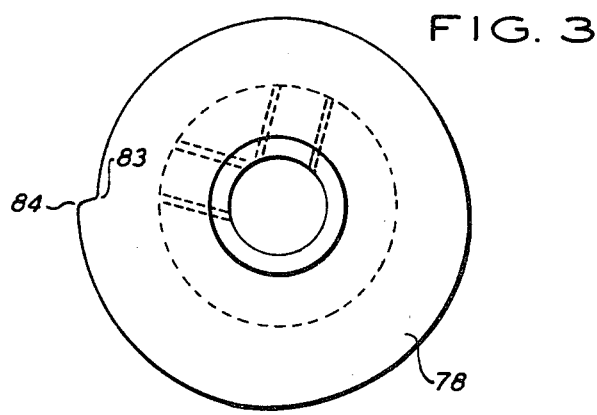
FIGURE 3 is an elevational view of a cam such as may be used as a part in the pump of FIGURE 2.

The motors 19 and 21 are controlled and energized by sources of power 22, and 23 or 24 through programming means, generally designated 25, which are connected thereto through a stepping switch 26, a voltage-controlled pulse oscillator 27, and an amplifier and motor driver 28. The pumps 12 and 15 are desirably those of a constant-displacement type, an embodiment of which is illustrated in FIGURES 2 and 3, so as to provide a substantially non-pulsating flow of liquid. Each motor has a drive cam 78 which is advanced a specific angular increment each time its motor receives an electric pulse from its control means.

The voltage-controlled pulse oscillator 27 for the first motor 19 is such that there is provided a maximum pulse repetition rate at the maximum level of control signal, say 5 volts, and a zero pulse repetition rate at the minimum, or zero volt, level of control signal, while that designated 27′ for the second motor 21 is such that there is provided a maximum pulse repetition rate at the minimum or zero level of control signal and a zero pulse repetition rate at the maximum level of the control signal, say 5 volts.

Assuming that the control signal has a level from zero to 5 volts, $w_1$ and $w_2$ are the angular velocities for pumping the drive motors of the first and second components (the angular velocity of the motor is proportional to both the flow rate of the associated pump and to the value of the control signal), "$v$" is the value of the control signal expressed in volts, "$k$" is a constant of proportionality and "$r$" is a ratio value, less than 1, set by the programming device to be described later:

$$\left.\begin{array}{l}w_1 = kv \\ w_2 = k(5-v) \\ v = 5r\end{array}\right\} \text{From linear relation between control signal and pumping rate.}$$

$v = 5r$
$5 - v = 5(1-r)$ then:

$$w_1 = 5kr$$
$$w_2 = 5k(1-r)$$

and:

$$w_1 + w_2 = 5k = \text{constant}$$

therefore:

$$\frac{w_1}{w_2} = \frac{r}{1-r}$$

It can thus be seen that the sum of the flow rates of the two pumps can be a constant value with the ratios of the two components determined by the setting of the programming device. Obviously, although the sum flow rate is intended to remain constant during a given program run, it is intended that the user of the apparatus will be able to change the sum flow rate between periods of programmed runs. This may be accomplished by means of change gears between the drive motors and their respective pumps, changing the effective displacement of the pumps, changing the proportionality constant, "$k$" of a voltage controlled oscillator, servoamplifier as later described, or by other conventional means.

The programming apparatus 25 shown in FIGURE 1 consists, in the present embodiment, of eleven calibrated potentiometers, designated 29 through 39, and a motor magnet-operated stepping switch 26. The settings of the potentiometers may thus be adjusted to provide a ten straight-line linear approximation of the desired relationship between the concentration ratio of a liquid and the delivered volume. The stepping switch 26, by having a series of contacts 41, connected to the potentiometers 29 through 39 as illustrated, additionally provides a three-step approximation of each of the three straight-line segments of each potentiometer.

The stepping switch 26 is operated by a pulse generator 42 and completes in ten minutes its program of thirty position changes with the setting illustrated. The setting may, of course, be changed by moving the control switch 43 from the illustrated position to any of the intermediate contact positions, represented as three series of X2, X4, X6 and X12, and in the present embodiment terminating in a "12 day" contact. The "12 day" position thus produces a pulse rate much slower than the pulse rate of the pulse generator and operates the motor magnet 44 of the switch 26.

The variable pulse repetititon rate produced by the combination of the pulse generator 42 and the operation of the selector switch 43, is used to operate the electromagnet 44 and a ratchet arrangement to move the electrical contact of the stepping switch from position 0 to position 31, to select a series of potentials determined by the setting of the switch 26 on the program potentiometers 29 to 39. Each time the pulse generator and divider combination 42 produces an output pulse, the above-mentioned magnet-operated stepping switch 26 advances one position. A suitable pulse generator may include a single lobe cam, not shown, which rotates on a shaft once every twenty seconds and depresses a microswitch to provide a contact closure every twenty seconds.

The first element of the divider chain is an additional group of microswitches operating off of a shaft set by a 12 to 1 gear reduction from the shaft of said single lobe cam mentioned above. This lower speed shaft may carry cams of different numbers of lobs to operate switches at intervals of differing frequencies. The higher speed cam provides one contact closure every twenty seconds, and the lower speed set of cams provides contact closures at slower intervals, such as once every selected time interval. Such time intervals may be 40 seconds, 80 seconds, 120 seconds, and 240 seconds. The one-per-240 second pulse output operates a different magnet-ratchet actuated stepping relay having twelve positions.

This stepping relay is provided with contacts to provide progressively less and less frequent circuit closures. The one-clusure-per-twelve-steps contact of the stepping relay operates a second similar stepping relay one-twelfth as fast as the first stepping relay. The "10 min." selector switch position indicates the amount of time that it takes the stepping switch connected to the program potentiometers to progress from position "0" to position "30." Similarly, the "12 day" position indicates a cycle time from position "0" to position "30" on the stepping switch of 12 days. Intermediate selector switch positions are labeled "20 minutes," "40 minutes," etc.

When the stepping switch rotates around to position "31," the cam 52 opens the contacts of switch 51. This shuts off the source of power to the pulse generator 42 and stops the operation of the programmer 25. The purpose of this is to prevent a second programmed cycle from starting after the first program has been completed. In order to re-start the program cycle, the reset-run switch 45 is momentarily turned to engage the reset contact 46. If switch 47 is set to the illustrated final concentration position, the pump 15 will continue to discharge the fluid in reservoir 16 having the final concentration provided, corresponding to the programmed potentiometer connected to position "30" of the stepping switch. If, however, switch 47 is set to the initial concentration position, the pump 12 will go back to pumping the initial concentration of reservoir 13 set by the programmed potentiometer connected to the "0" position of the stepping switch.

It may be desirable for the pump 12 to go back to pumping the initial concentration at the end of the program for the purpose of regenerating or equilibrating the chromatographic column that the pump is supplying. If switch 48 is set to position (A), the pumps 12 and 15 will continue to run at the end of a set program, deriving their power from the source 23, here indicated as 24 volts, through contact 49. If switch 48 is set to position (B), the pumps will stop when that programmed position is reached and the switch 51 opens by operation of its cam 52. If switch 48 is set to position (C), the pumps will continue to operate for a time interval after the program cycle is complete.

The normally closed contacts of the variable delay timer 50, shown connected to position (C) switch contact 53, will supply power to the pump drive motors until the time interval set on the timer has expired. The initiation of this time interval takes place when switch 51 is opened at the end of a programmed cycle by operation of cam 52. An additional output terminal 54 connected to a so-labeled "power source for motors" is provided for supplying a control signal to operate an external pump, not shown, through an external normally closed relay, not shown.

Such an external pump could be either a conventional pump or an additional ratio pump of the type described in this patent application. It could be used for the purpose of supplying liquid to the chromatographic column, or other liquid-using system, after the programmed cycle has been completed and the power on the first gradient pump turned off. This could be done to accomplish various purposes, such as providing a flow stream with a programmed gradient which requires more than two fluid reservoirs, such as a ternary or quarternary gradient. The conventional pump could be used for an analogous purpose or for the purpose of regenerating a chromatographic column with liquid which differs from either of the fluids contained in the two fluid reservoirs.

As an alternative to the use of apparatus including the pulse oscillators 27, the motors 19 and 21 may be controlled by servoamplifiers 84 and 84'. Each motor may be coupled with velocity feedback to its servoamplifier to insure that the angular rotation rate of the motor is proportional to the magnitude of the control signal. The velocity feedback could be derived from a tachometer, not shown, attached to the drive motor. The servoamplifier compares the input potential from the programming mechanism to the potential supplied by the tachometer. The servoamplifier amplifies the potential difference between the tachometer and the program potential and applies it to the drive motor. This causes the drive motor to operate at such a speed that the tachometer voltage correctly balances the program voltage. Under these conditions the motor mechanism will operate at a speed directly proportional to the program voltage.

The stepping switch 26 is preferably provided with means for resetting it to its initial position as shown by the off normal switch labeled "ONS" and interrupter labeled "INT."

Referring now to the embodiment of one of the identical pumps 12 and 15, illustrated in FIGURES 2 and 3, it will be seen that said pump, such as that designated 12, may have a diaphragm 55 made of plastic-coated fabric or the like. There is a screw 56 which holds the diaphragm to the push rod 57, connected to the driving mechanism, generally designated 58. The peripheral portion of the diaphragm 55 is sandwiched between the valveholding portion 59 of the pump and head guiding portion 61 of the pump. Liquid is fed to the diaphragm chamber 62 through inlet valve assembly 63 and discharged therefrom through outlet valve assembly 64.

As will be seen, inlet valve 63 includes a ball 65 held in place on a valve seat 66 by a spring 67. The outlet valve 64 has a ball 68 held in place on its seat 69 by spring 71. The other details of the valves and those of the push rod 57 will be clear from the drawing. As the pump head 72 is drawn to the right by the return spring 73, the employed liquid will flow through the inlet valve assembly 63, or in the direction of the arrow 60, to the diaphragm chamber 62. Upon return or movement of the push rod 57 and its head 72 to the left against the action of the spring 73, the ball 65 will seat and the ball 68 unseat, allowing liquid to flow out of the valve assembly 64 in the direction of the arrow 70.

The drive mechanism for the pump 12 is illustrated as an electric motor 19, the shaft of which is extended, as indicated at 74, and fixedly carries a pinion 75 meshing with a gear 76 fixed on shaft 77. The shaft 77 carries a linear rise cam 78 which, because of the reduction gearing, is turned at a slower rate than the shaft of the motor 19. The cam 78 engages a follower-roller 79, pivotally mounted in a cam follower 81, as indicated at 82. The cam follower 81 is bifurcated both ways, so as to straddle the linear-rise cam 78 as well as the cam shaft 77, thereby allowing turning of the cam therein.

The cam 78, shown in detail in FIGURE 3, has a major portion which, in the present embodiment, increases in radius clockwise from a minimum radius of .339" at 83, at a gradual rate, to a maximum radius of .375" at 84, from whence the cam profile drops back sharply or steeply to the minimum radius. This means that turning of the cam 78 moves the diaphragm evenly while discharging throughout a nearly complete revolution, and then suddenly the head 72 is allowed to retrace. Then the flow of liquid out of the valve 64 momentarily stops and liquid rushes into the pump through inlet valve 63 to place it in condition for a repetition of the pumping operation.

It will, therefore, be seen that the flow of liquid from the pump, assuming the motor operates at uniform speed, is practically constant except at the end of each cam revolution where there is a momentary stoppage and then a repetition of the pumping operation.

To recapitulate, the selector switch is used to select the desired time for which the pumping program is to run. The pulse rate selected by the selector switch operates the stepping switch. The stepping switch selects electrical potentials which are determined by the program potentiometers. The program potentiometers may be set by the user of the apparatus to correspond to a ten straight line function approximating the desired concentration-volume relationship. The voltage output from the stepping switch is used to operate the two constant-displacement pumps; as the voltage rises one constant-displacement pump pumps faster and the other pumps slower with their sum pumping rate being constant.

Having now described my invention in detail in accordance with the requirements of the Patent Statutes, those skilled in this art will have no difficulty in making changes or modifications in the individual parts or their relative assembly in order to meet specific requirements or conditions.

I claim:

1. Apparatus for combining two streams of fluid to produce a single stream having a substantially constant flow, comprising first and second pumps to respectively produce the two streams which merge into a single stream, power means to drive said pumps, and means to control said power means including a programming means providing a control signal, wherein the first pump is made to operate faster by its control means upon an increase in the value of said control signal and operates at a maximum speed while the second pump is stopped, and the second pump is made to operate slower by its control means upon an increase in the value of said control signal and operates at a maximum speed while the first pump is stopped, and the pumps operate at varying speeds between said stops and maximum speeds, with the speed of the first pump decreasing while that of the second pump is increasing and vice versa, said programming means being made up of a group of variable potentiometers and a stepping switch to sequentially select voltages from successive potentiometers, and a variable rate pulse generator to operate said stepping switch.

2. Apparatus as recited in claim 1, wherein the stepping switch interpolates intermediate values between the variable potentiometers.

3. Apparatus for combining two streams of fluid to produce a single stream having a substantially constant flow, comprising first and second pumps to respectively produce the two streams which merge into a single stream, power means to drive said pumps, means to control said power means in accordance with a program, programming means including a preset program circuit determining said program, timing means determining the duration of said program and stopping it at a definite time, and a selector switch for connecting a control circuit of said control means to said program circuit, whereby the first pump operates at maximum speed while the second pump is stopped, the second pump operates at maximum speed while the first pump is stopped, and the pumps operate at varying speeds between said stops and maximum speeds, with the speed of the first pump decreasing while that of the second pump is increasing and vice versa, and wherein the ratio of the rates of flow of the two individual streams is determined by said preset program, and the selector switch is provided so that when the program cycle stops at a definite time, the first and second pumps can be caused by a desired setting of said switch to stop immediately at the expiration of the program, stop after a selected time-delay interval, or continue to operate, and cause the pumps to deliver either a selected final fluid or a selected initial fluid.

4. In apparatus for combining two streams of fluid to produce a single stream having a substantially constant flow, comprising first and second pumps to respectively produce the two streams which merge into a single stream, and power means to drive said pumps at speeds smoothly variable between stop and a maximum speed, the improvement which comprises: a voltage-controlled oscillator for each of said pumps to control said power means to positively vary the speed of said pumps in accordance with a program, whereby the first pump is made to operate faster by an increase in the pulse repetition rate of its oscillator upon an increase in the value of a control signal and operates at a maximum speed while the second pump is stopped, the second pump is made to operate slower by a decrease in the pulse repetition rate of its oscillator upon an increase in the value of a control signal and operates at a maximum speed while the first pump is stopped, and the pump drive speeds are proportional to the pulse repetition rates of their respective oscillators between said stops and maximum speeds, with the speed of the first pump decreasing while that of the second pump is increasing and vice versa.

5. Apparatus as recited in claim 4, wherein means is provided for changing the proportionality constant between pump operating speed and control signal value, so as to provide for adjustment of the value of the sum of two individual component streams.

6. Apparatus for combining two streams of fluid to produce a single stream having a substantially constant flow, comprising first and second pumps to respectively produce the two streams which merge into a single stream, and drive motors coupled to the pumps to drive said pumps at speeds smoothly variable between stop and a maximum speed, the improvement which comprises: a servoamplifier for each of said pumps to operate said drive motors to positively vary the speed of said pumps in accordance with a program, said drive motors supplying velocity feed back to said servoamplifiers so that the speed of each drive motor has the desired linear relationship to the value of its control signal, whereby the first pump is made to operate faster by its servoamplifier upon an increase in the value of its control signal and operates at a maximum speed while the first pump is stopped, the second pump is made to operate slower by its servoamplifier upon an increase in the value of its control signal and operates at maximum speed while the first pump is stopped, and the pumps operate at varying speeds between said stops and maximum speeds, with the speed of the first pump decreasing while that of the second pump is increasing and vice versa.

7. Apparatus as recited in claim 6, wherein means is provided for changing the proportionality constant between pump operating speed and control signal value, so as to provide for adjustment of the value of the sum of two individual component streams.

References Cited

UNITED STATES PATENTS

| | | | |
|---|---|---|---|
| 2,803,192 | 8/1957 | Crabtree | 103—11 |
| 2,939,285 | 6/1960 | Hawkins et al. | 103—11 X |
| 2,957,420 | 10/1960 | Reynolds et al. | 103—150 X |
| 3,005,411 | 10/1961 | Metz | 103—11 |
| 3,068,796 | 12/1962 | Pflunger et al. | 103—11 |
| 3,294,023 | 12/1966 | Vegue et al. | 103—11 |
| 3,304,869 | 2/1967 | Blume | 103—11 |
| 3,250,218 | 5/1966 | Sinclair | 103—11 |

WILLIAM L. FREEH, *Primary Examiner.*

UNITED STATES PATENT OFFICE
CERTIFICATE OF CORRECTION

Patent No. 3,398,689         Dated August 27, 1968

Inventor(s) Robert W. Allington

It is certified that error appears in the above-identified patent and that said Letters Patent are hereby corrected as shown below:

Column 5, line 14, the word "additionally" should be deleted

Column 5, line 15, the word "three" should be deleted.

Column 5, line 16, the words "of each potentiometer" should be deleted.

Signed and sealed this 4th day of June 1974.

(SEAL)
Attest:

EDWARD M. FLETCHER, JR.
Attesting Officer

C. MARSHALL DANN
Commissioner of Patents